(12) United States Patent
James

(10) Patent No.: US 11,048,026 B2
(45) Date of Patent: Jun. 29, 2021

(54) CONVEX LIGHT REFLECTION VIEWING DEVICE

(71) Applicant: Maxfit Lifestyles, LLC, Jenison, MI (US)

(72) Inventor: Theodore D. James, Jenison, MI (US)

(73) Assignee: MaxFit Lifestyles, LLC, Plainwell, MI (US)

( * ) Notice: Subject to any disclaimer, the term of this patent is extended or adjusted under 35 U.S.C. 154(b) by 118 days.

(21) Appl. No.: 16/685,709

(22) Filed: Nov. 15, 2019

(65) Prior Publication Data

US 2020/0081166 A1 Mar. 12, 2020

Related U.S. Application Data

(60) Provisional application No. 62/769,972, filed on Nov. 20, 2018.

(51) Int. Cl.
*G02B 5/10* (2006.01)
*G02B 7/182* (2021.01)
*A63B 21/00* (2006.01)

(52) U.S. Cl.
CPC ............ *G02B 5/10* (2013.01); *A63B 21/4037* (2015.10); *G02B 7/1824* (2013.01)

(58) Field of Classification Search
CPC ...... G02B 5/10; G02B 7/1824; A63B 21/4037
USPC .................................................. 359/838–883
See application file for complete search history.

(56) References Cited

U.S. PATENT DOCUMENTS

| | | | |
|---|---|---|---|
| 426,869 A * | 4/1890 | Simon | |
| 1,872,905 A * | 8/1932 | Darling | B60R 1/002 359/868 |
| 3,019,689 A * | 2/1962 | Paulsrud | G02B 23/08 359/857 |
| 4,360,836 A * | 11/1982 | Breck | H04N 9/3141 348/819 |
| 4,388,678 A * | 6/1983 | Turner | F21V 7/0008 362/293 |
| 4,470,665 A * | 9/1984 | Blom | B29D 11/00596 359/627 |
| 4,531,813 A | 7/1985 | Van den Berg | |

(Continued)

FOREIGN PATENT DOCUMENTS

CN 86208183 10/1986

OTHER PUBLICATIONS

Besserer, Daniel et al., FITMIRROR: A Smart Mirror for Positive Affect in Everyday User Morning Routines; ICMI '16, MA(3) HMI Workshop; Nov. 12-16, 2016; pp. 1-8; Tokyo, Japan.

*Primary Examiner* — Ricky D Shafer

(74) *Attorney, Agent, or Firm* — Frank M. Scutch, III

(57) ABSTRACT

A convex mirrored device that is placed on the floor to reflect electronic viewing monitors in view of the user when in downward facing positions. The device includes one or more convex arched mirrors that are placed on the floor between the user and the screen with the reflective side up. The arched mirror allows the user to execute multiple different downward facing positions while viewing monitor screens in the room having different sizes and heights. In one embodiment, the device attaches to the front of an activity mat and has hinges between the mirrors so that activity mat and the mirrored device can be rolled up and folded together. This enables the device to rolled up and folded for easy transportation and storage by the user.

17 Claims, 7 Drawing Sheets

(56) References Cited

U.S. PATENT DOCUMENTS

| | | |
|---|---|---|
| 4,679,916 A | 7/1987 | Roller |
| 5,124,840 A | 6/1992 | Trumbull |
| 5,270,751 A | 12/1993 | Christian |
| 5,321,556 A | 6/1994 | Joe |
| 5,422,759 A | 6/1995 | Lee |
| 5,589,984 A * | 12/1996 | Schmidt .................. G02B 5/10 359/603 |
| 5,940,229 A * | 8/1999 | Baumgarten .......... H04N 7/142 359/839 |
| 5,997,147 A | 12/1999 | Tatoian |
| 6,059,417 A | 5/2000 | Tatoian |
| 6,293,679 B1 | 9/2001 | Schmidt |
| 7,316,485 B2 | 1/2008 | Roose |
| 8,172,411 B2 | 5/2012 | Wu |
| 2019/0053646 A1 * | 2/2019 | Grin ..................... E05D 7/0009 |

* cited by examiner

CONVEX LIGHT REFLECTION VIEWING DEVICE

FIELD OF THE INVENTION

The present invention relates to novel convex light reflector and, more particularly, the invention relates to be used as a light reflection viewer during activity for the user while looking downwardly and also needing to see a television screen.

BACKGROUND

Activities involving viewing a television have become very popular. Examples include but are not limited to fitness videos and video games. Many activities that involve television viewing have the user in downward facing positions. In these positions the user generally cannot view the television without straining or stopping the activity altogether. The user needs to reference a television or monitor screen in order to see if they are doing the activity correctly. Accordingly, solutions are needed to assist users in viewing television and/or video monitors when exercising or conducting when conducting floor-based activities.

BRIEF SUMMARY OF THE INVENTION

The present invention seeks to provide a solution to this problem by providing a convex mirrored device that is placed on the floor to reflect the television in view of the user when in downward facing positions. The invention comprises convex arched mirrors that are placed on the floor between the user and the screen with the reflective side up. The arched mirror allows the user to execute multiple and/or different downward facing positions while viewing monitor screens having different room positions, sizes and heights.

Generally, the invention can be attached to the front of an activity mat and includes hinges between the mirrors so that both the activity mat and the mirrored device can be rolled up and folded together. Hence, an important attribute of the device is its ability to be rolled up and folded together for easy transportation and storage for the user.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of techniques and steps are disclosed. Each of these has the individual benefit and each can also be used in conjunction with one or more, or in some cases all, of the other disclosed techniques. Accordingly, for the sake of clarity, this description will refrain from repeating the name of every component in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. The present disclosure is to be considered as an exemplification of the invention and is not intended to limit the invention to the specific embodiments illustrated by the figures or description below. The present invention will now be described by referencing the appended figures representing preferred embodiments.

Figure 1:
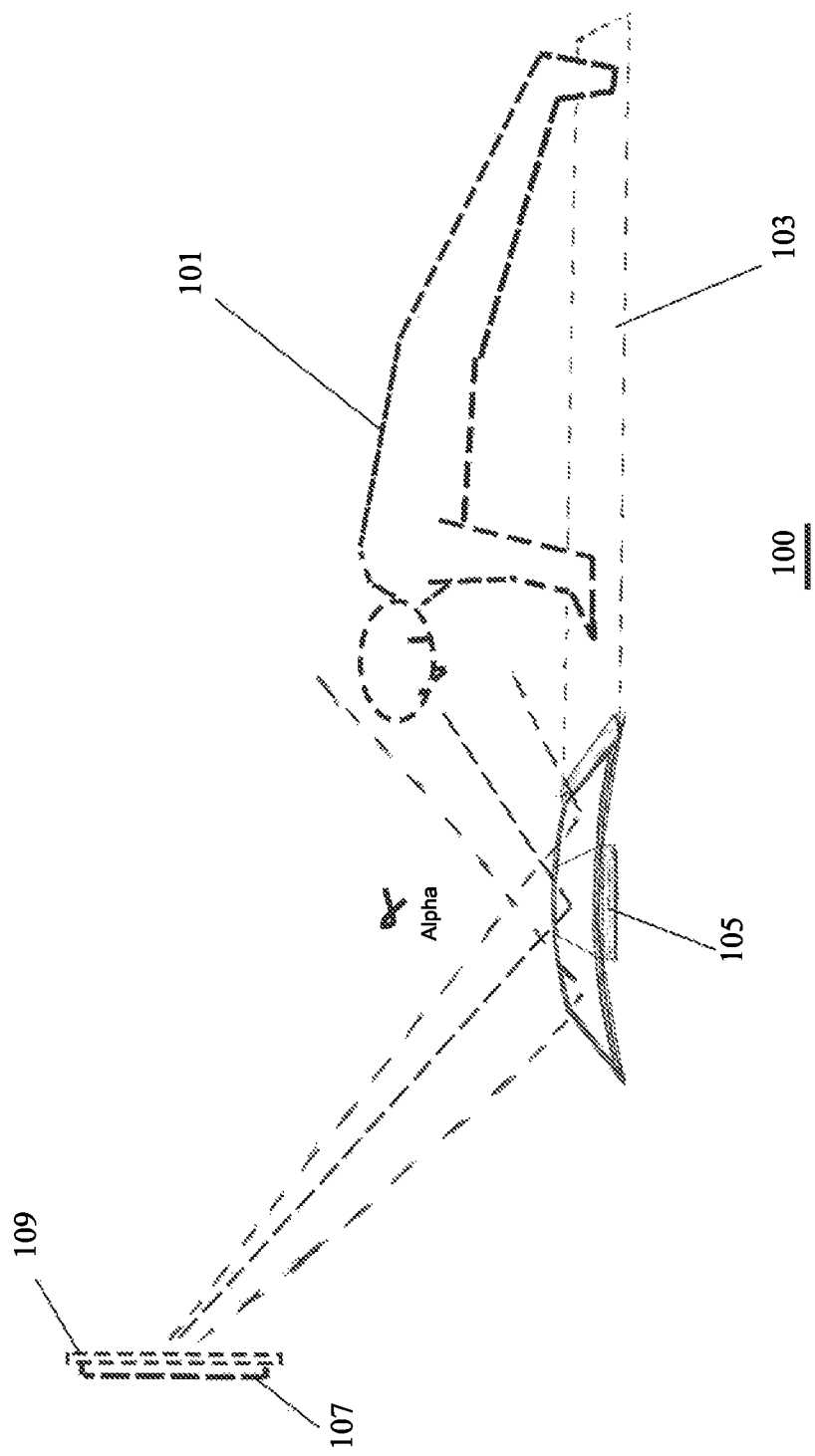
FIG. 1 illustrates a schematic view showing a person looking at an electronic monitor screen through the convex light reflection viewing device while in a facedown activity position.

FIG. 1 is a perspective view of the environment 100 as typically used in connection with the invention. As seen in FIG. 1, a user's body 101 is positioned in a facedown position toward the floor and/or exercise mat 103. The user 101 looks through the convex light reflector device 105 (hereinafter the "device") that is also on the floor. A television or monitor housing 107 is typically mounted on the wall or extends from the floor and is located some predetermined distance from the device 105, at the other side of an activity space. The device 105 is positioned on the floor between the user 101 and the monitor screen 109. Those skilled in the art will recognize that the angle of incidence alpha ($\alpha$) of the reflected light will vary greatly enabling the device 105 to be conveniently placed at various positions inside the room enabling the user to view a television, monitor device or other display. In geometric optics, the angle of incidence is the angle between the ray reflected on a surface and the line perpendicular to the surface at the point of incidence, called the normal. The optical ray is formed by the optical wave projected by the monitor, where the user can view the optical ray coming from the television or monitor device, when at the correct angle of incidence. A great advantage in using the invention during exercise is that the user 101 is able to view the monitor 107 in various facedown positions due to the convex nature of mirrored surfaces the offer the correct angle of incidence. In use, the closer the user's viewpoint is to the floor, the closer the reflection from monitor screen 109 will appear in the device 105. Conversely, the further away the user's viewpoint is from the floor 103, the further away the monitor screen 109 reflection will appear in the device 105.

Figure 2:
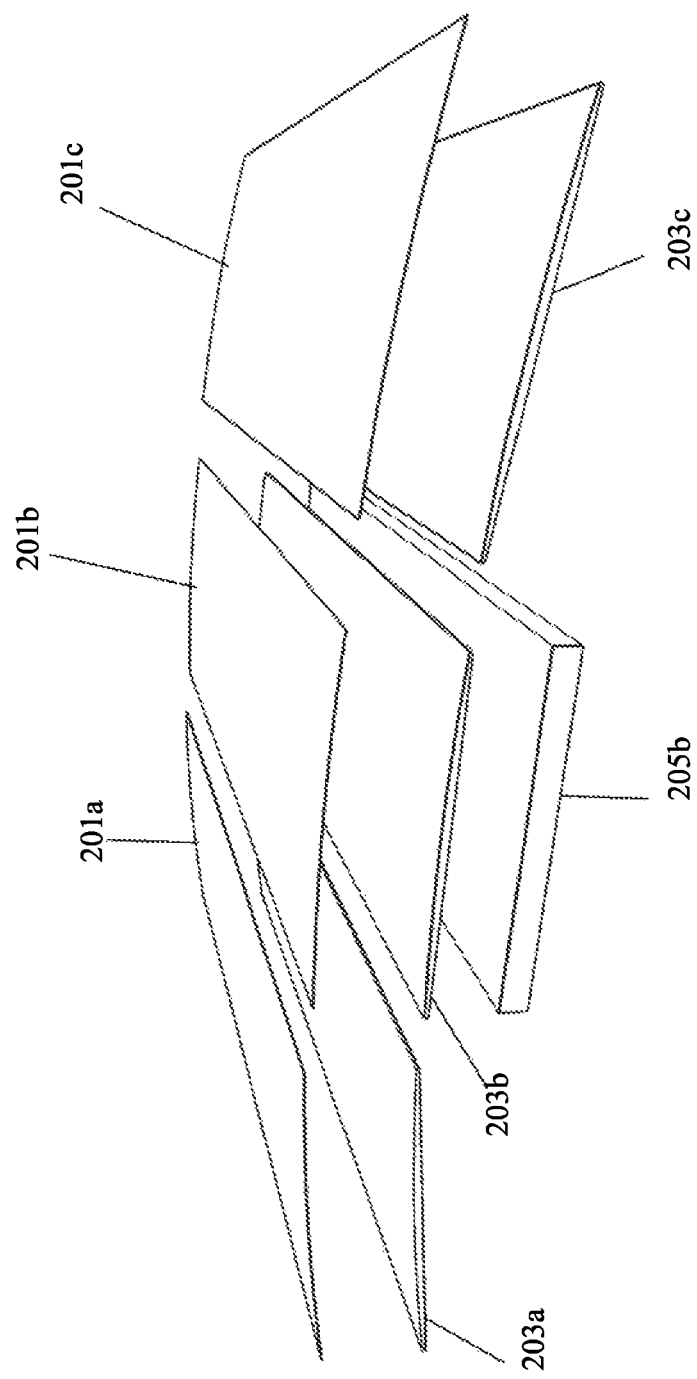
FIG. 2 illustrates an exploded perspective view of a convex light reflection viewing device according to an embodiment of the invention.

FIG. 2 is an exploded perspective view of the components used in the construction of the convex light reflector device 200. In a preferred embodiment, each of the elements of the device 200 are configured using between one to seven mirrored elements or "mirrors". Although the mirrored elements are manufactured of a pliable plastic, those skilled in the art will further recognize they may be made of other reflective materials as well. As seen in FIG. 2, the device 200 is shown using three mirrors viz. mirrors 201*a*, 201*b*, 201*c*. Each of these mirrors 201*a*, 201*b*, 201*c* may be made from glass, acrylic, polycarbonate and/or other similar or suitable materials enabling the mirror to be flexed or "bent" into a substantially convex shape or position. Each mirror 201*a*, 201*b*, 201*c* will be applied to a respective rigid convex arched backing 203*a*, 203*b*, 203*c* (hereinafter "backing") with an intermediate adhesive layer configured therebetween. As described herein, each convex arched backing 203*a*, 203*b*, 203*c* is attached to at least one other backing using a hinge-like attachment allowing each respective backing 203*a*, 203*b*, 203*c* to move and/or swivel independently. Each backing 203*a*, 203*b*, 203*c* is supported by one or more center supports 205. Only one center support 205*b* is illustrated in FIG. 2.

Figure 3:
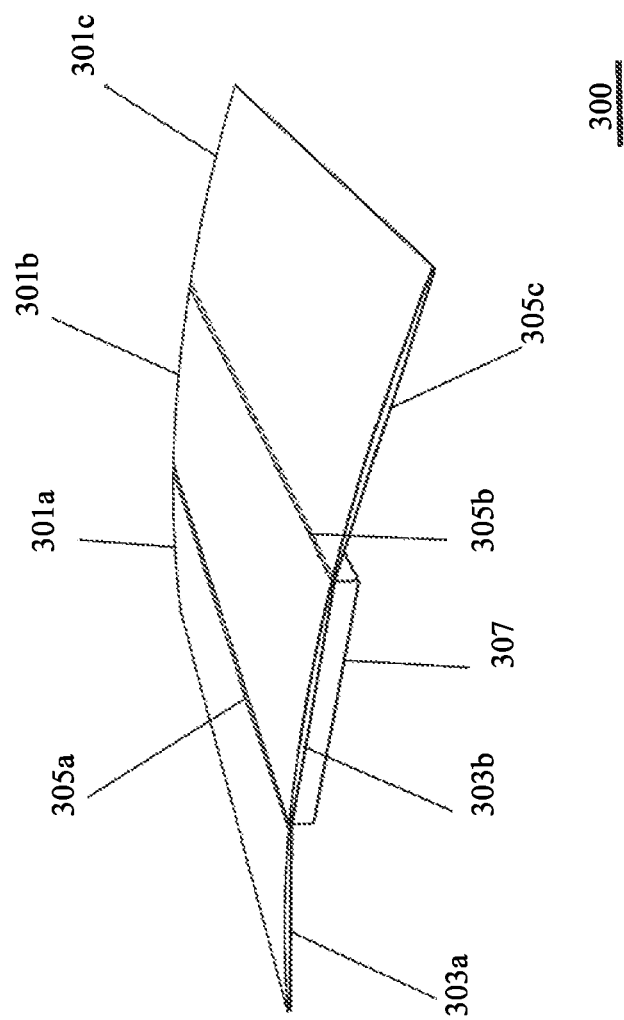
FIG. 3 illustrates a perspective view of a convex light reflection viewing device in an open position according to an embodiment of the invention.

FIG. 3 illustrates a perspective view of one example of a convex light reflection viewing device 300 shown in an opened or "in use" position according to various embodiments of the invention. As seen in FIG. 3, the mirrored elements 301*a*, 301*b*, 315*c* are joined or abutted to form a substantially continuous surface. Each surface is supported by a respective backing 303*a*, 303*b*, 303*c*. The hinged joints 305*a*, 305*b* work to allow the device 300 to be folded in a compact package for transport. A center support 307 allows the mirrored elements 301*a*, 301*b*, 301*c* to have an appearance of one continuous arch while in certain open positions. The center support(s) 307 are preferably made of a high-density foam or other suitable materials that are light weight.

Figure 4:
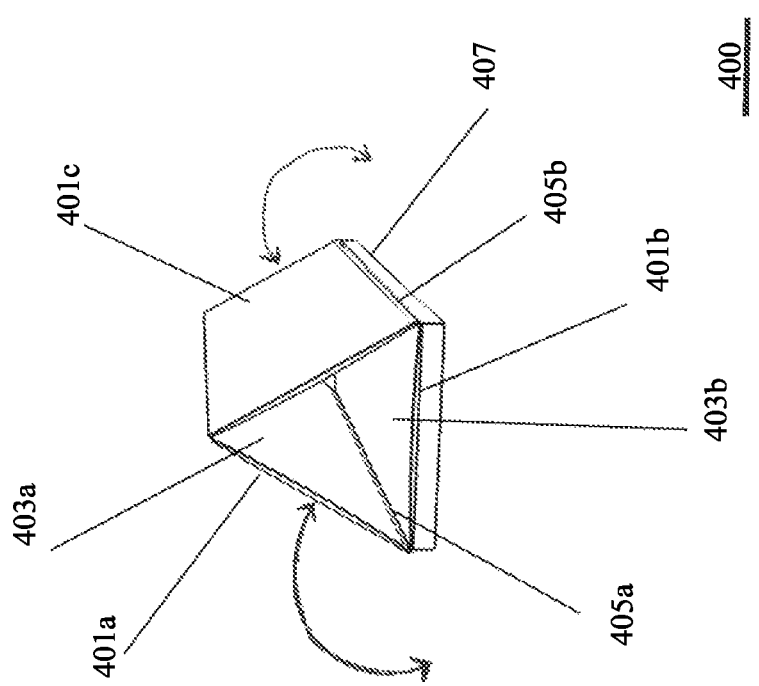
FIG. 4 illustrates a perspective view of a convex light reflection viewing device in a closed position according to an embodiment of the invention.

FIG. 4 illustrates how the device 400 can be configured or folded together in order to condense its size for ease of storage or transportation when not in use. Each mirrored elements 401*a*, 401*b*, 401*c* and its respective backing 403*a*, 403*b*, 403*c* move and fold independently into itself. The hinges 405*a*, 405*b* allow the mirrored elements 401*a*, 401*c* and backing 403*a*, 403*b*, 403*c* to be rolled and/or folded into a triangular shape so each to mirrored elements 401*a*, 401*b*, 401*c* rest on the center support 407 and make an overall more compact shape as opposed to its extended position. This bundled like shape facilitates easy transport and storage of the device when not in use.

Figure 5:
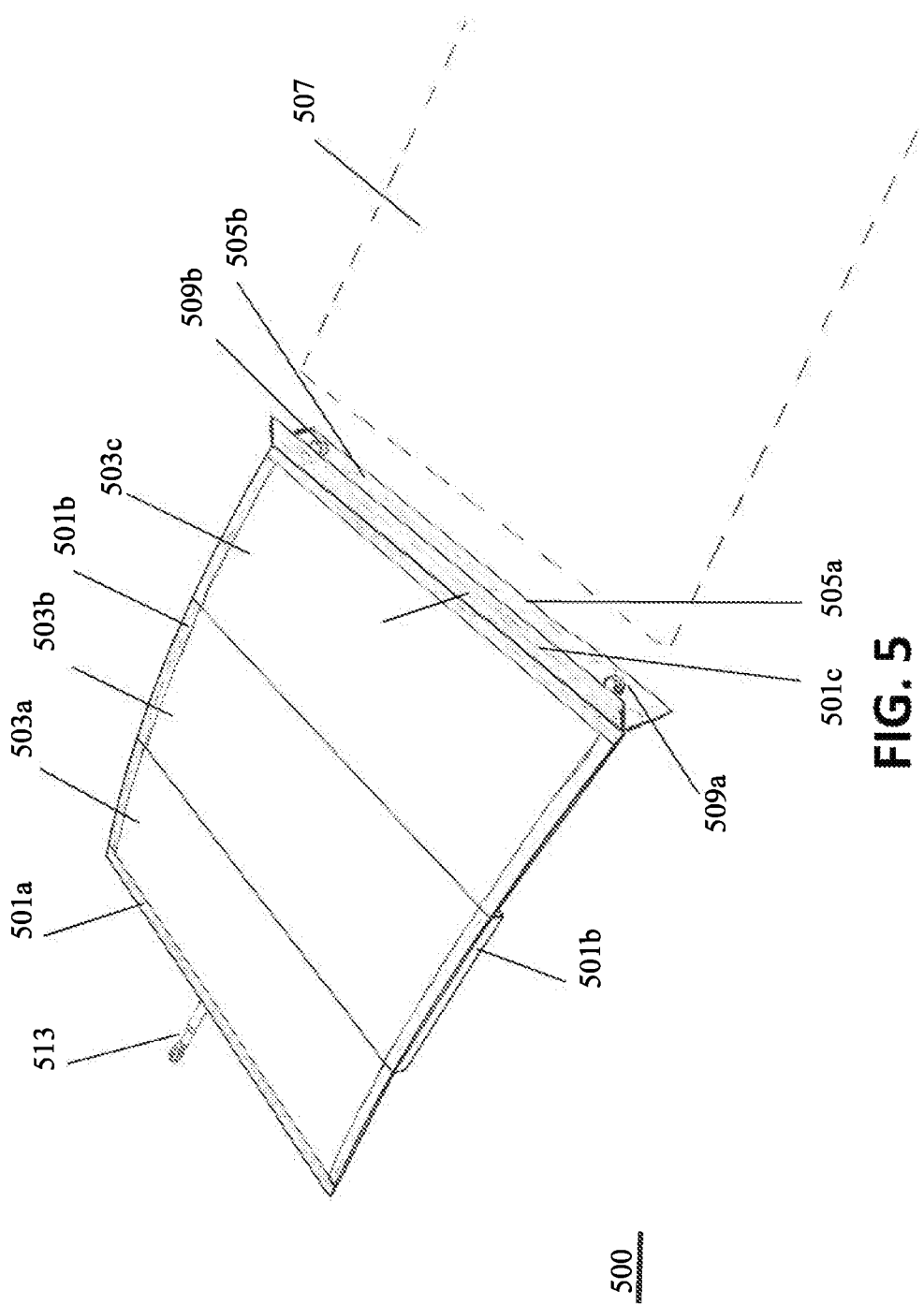
FIG. 5 illustrates a top view of a convex light reflection viewing device according to an alternative embodiment of the invention.
Figure 6:
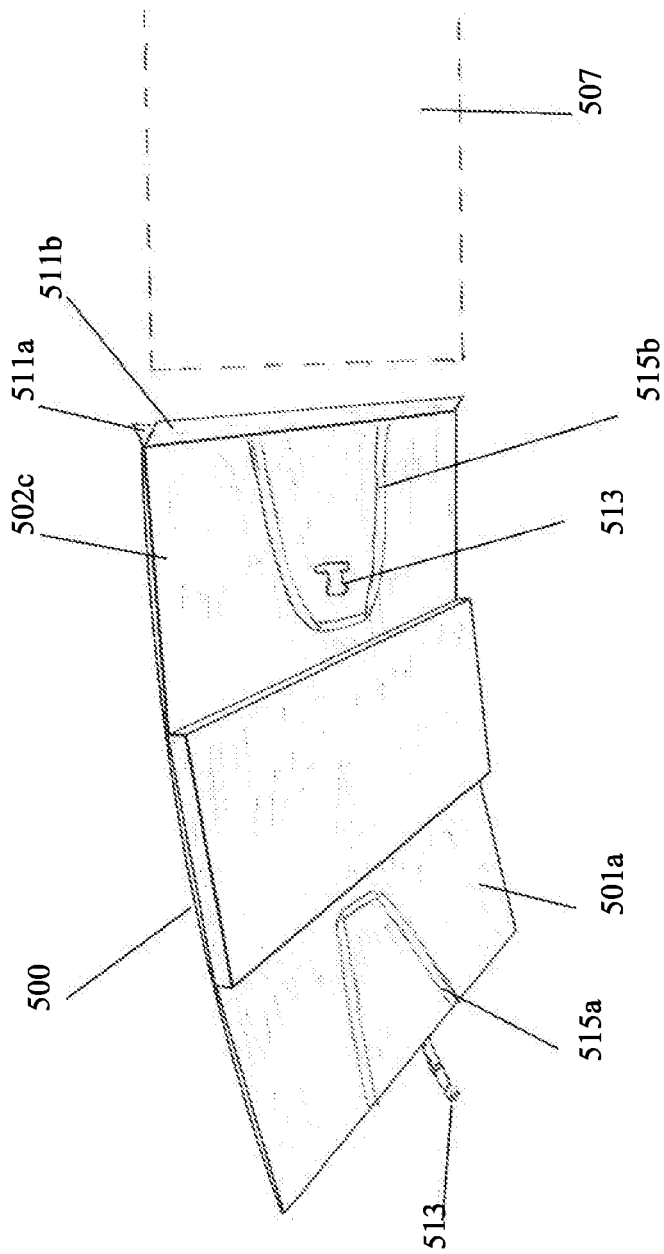
FIG. 6 is a bottom view of the light reflection viewing device shown in FIG. 5.
Figure 7:
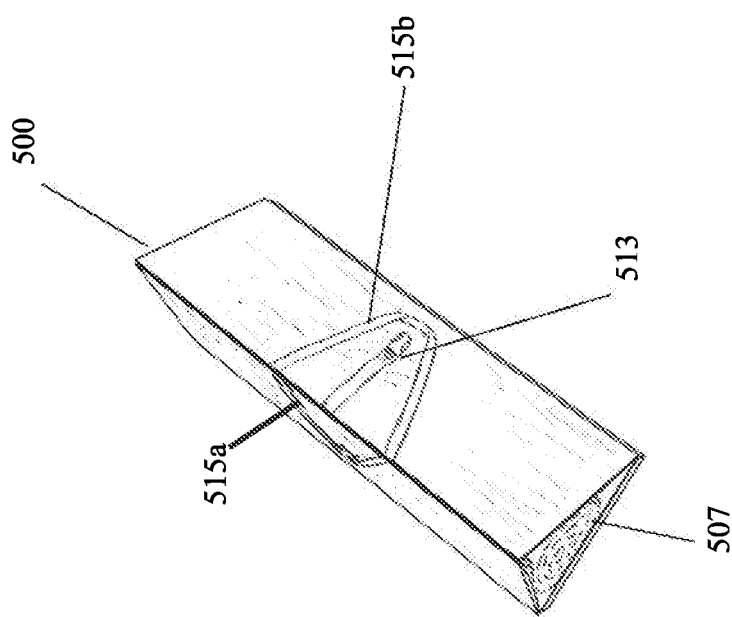
FIG. 7 is a perspective view of the convex light reflection viewing device in FIG. 5 illustrated in a closed position.

FIG. 5, FIG. 6 and FIG. 7 illustrate an alternative embodiment of the invention, where the convex light reflector device 500 is backed with textile. More specifically, FIG. 5 is an upper perspective view, FIG. 6 is a lower perspective view and FIG. 7 is a folded view. In this embodiment a textile 501*a*, 501*b*, 501*c* is used to reinforce and protect the structure. Those skilled in the art will further recognize that a textile is typically a type of cloth or woven fabric that is durable yet light in weight. The textile 501*a*, 501*b*, 501*c* is configured to "frame around" the mirrored elements 503*a*, 503*b*, 503*c* and enclose the backings, center support and the attachment area 505*a*, 505*b*. While in use, the user has the option to attach an activity mat 507 to the attachment area 505*a*, 505*b* of the device 500. The attachment area 505*a*, 505*b* can attach to an activity mat 507 of various sizes using fasteners or clips. The clips 509*a*, 509*b* that are fixed within an upper and lower piece of textile 501*a*, 501*b*, 501*c* which is embodied in the attachment area 501*a*, 505*b*. The upper textile piece 511*a* and lower textile piece 511*b* of the attachment area 505*a*, 505*b* encloses the activity mat 507 and clips 509*a*, 509*b* between them. Once the activity mat 507 is attached to the device 500, it will remain in the proper position for the user 101 during the activity. As seen in FIG. 7, the activity mat 507 can be folded and/or rolled up and stored within the device 500. Once the device is folded to a closed position it is easy to transport or store both the device 500 and activity mat 507. The device 500 also includes adjustable straps and/or buckles 515*a*, 515*b* enabling the device 500 to remain in a closed position. The handles 515*a*, 515*b* can be used to easily carry the device.

Thus, the present invention is directed to a convex light reflection viewing device that includes a plurality of reflective elements that use a backer attached under each respective reflective element. The backer provides an attaching surface for one or more of the reflective elements. A center support is used to raise the reflective element to form a convex surface for enabling viewing of a monitor screen while looking downwardly into the viewing device during exercise or the like. The device uses it convex shape to adjust the angle of incidence of light coming from the television monitor which is presented to user.

While preferred materials for elements have been described, those skilled in the art will further recognize that the device as described herein is not limited by these materials. Plastics, rubber, foam, aluminum, all textile materials, metal alloys, and other materials may comprise some or all of the elements of the convex light reflector devices and apparatuses in various embodiments of the present invention. Further, although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

I claim:

1. A convex light reflection viewing device comprising:
   a plurality of reflective elements;
   a backer attached under each respective one of the plurality of reflective elements for providing an attachment surface;
   at least one center support; and
   wherein the at least one center support raises at least one of the plurality of reflective elements to form a convex surface for enabling viewing of a monitor screen while looking downwardly into the viewing device.

2. A convex light reflection viewing device as in claim 1, wherein the backer and at least one center support are enclosed with a textile material.

3. A convex light reflection viewing device as in claim 1, wherein the plurality of reflective elements are plastic mirrors.

4. A convex light reflection viewing device as in claim 1, wherein the backers are attached to one another using at least one hinge.

5. A convex light reflection viewing device as in claim 1, wherein the center support is configured under at least one backer.

6. A convex light reflection viewing device as in claim 1, wherein the viewing device is attachable to a fitness matt.

7. A convex light reflection viewing device as in claim 1, wherein the device can be rolled up for easy storage.

8. A convex light reflection viewing device for use in personal fitness training comprising:
- a plurality of reflective elements each having a backer attached thereto;
- at least one center support centrally configured under the backer for slightly raising a center portion of the plurality of reflective elements above a floor; and
- wherein each backer is joined together to form a convex surface for enabling viewing of monitor screen while looking downwardly into the viewing device.

9. A convex light reflection viewing device as in claim 8, wherein the plurality of reflective elements are plastic mirrors.

10. A convex light reflection viewing device as in claim 8, wherein the backer is enclosed in a textile material.

11. A convex light reflection viewing device as in claim 8, where each backer is joined using a hinge for allowing the device to be folded.

12. A convex light reflection viewing device as in claim 8, wherein the viewing device can be connected to a fitness matt.

13. A convex light reflection viewing device as in claim 8, wherein the viewing device can be rolled into a bundle for easy transport.

14. A light reflection viewing device having a convex surface for use in personal fitness training comprising:
- a plurality of plastic mirrors;
- a plurality of backers each attached under each respective one of the plurality of reflective elements;
- a center support configured centrally under at least one of the plurality of backers; and
- wherein each of the backers are hinged to form a substantially continuous convex reflective surface configured such that an angle of incidences enables viewing of a monitor device located nearby while looking substantially downwardly into the viewing device.

15. A light reflection viewing device as in claim 14, wherein the plurality of backers are enclosed within a textile material.

16. A light reflection viewing device as in claim 14, wherein the device further includes a plurality of handles for transport.

17. A light reflection viewing device as in claim 14, wherein the device is pliable and can be rolled up for easy storage.

* * * * *